(12) United States Patent
Tokita

(10) Patent No.: US 6,448,321 B1
(45) Date of Patent: Sep. 10, 2002

(54) AQUEOUS DISPERSION, ITS PRODUCTION METHOD, AND ITS USE

(75) Inventor: Suguru Tokita, Kuga (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/351,915

(22) Filed: Jul. 14, 1999

(30) Foreign Application Priority Data

Jul. 16, 1998 (JP) ............................................ 10-201839
Jul. 17, 1998 (JP) ............................................ 10-204013

(51) Int. Cl.$^7$ ............................ C08K 5/09; C08K 5/098
(52) U.S. Cl. ...................... 524/394; 524/563; 524/570; 524/579
(58) Field of Search ................................ 524/394, 277, 524/563, 570, 579

(56) References Cited

U.S. PATENT DOCUMENTS 4,141,868 A * 2/1979 Emmons et al. ......... 525/282 X
4,870,118 A * 9/1989 Kinoshita et al. ........... 523/207

* cited by examiner

*Primary Examiner*—Judy M. Reddick
(74) *Attorney, Agent, or Firm*—Sherman & Shalloway

(57) ABSTRACT

An aqueous dispersion of a thermoplastic resin which is capable of forming a coating exhibiting excellent water resistance, oil resistance, chemical resistance and adhesion to non-polar materials as well as its production method and its applications are provided. More particularly, there is provided an aqueous dispersion comprising (A) a thermoplastic resin, (B) a salt of a higher fatty acid, and (C) water, wherein solid content is uniformly dispersed; a method for producing such an aqueous dispersion by melt kneading (A) a thermoplastic resin and (B') a higher fatty acid and/or an ester thereof, and adding a basic substance and water to the resulting melt kneaded product for neutralization and/or saponification to thereby uniformly disperse of the solid content in the aqueous phase; a thermal transfer ink comprising (A') an ethylene-vinyl compound copolymer and (B) a salt of a higher fatty acid; and a thermal transfer recording medium having a thermal transfer layer prepared by coating and drying the thermal transfer ink on the substrate.

14 Claims, No Drawings

AQUEOUS DISPERSION, ITS PRODUCTION METHOD, AND ITS USE

BACKGROUND OF THE INVENTION

This invention relates to an aqueous dispersion of a thermoplastic resin which is capable of forming a coating exhibiting excellent water resistance, oil resistance, chemical resistance and adhesion to non-polar materials; its production method; a thermal transfer recording medium comprising a substrate, and a thermal transfer layer on the substrate comprising a binder derived from such aqueous dispersion and a colorant.

Aqueous dispersions of a thermoplastic resin of various types are known in the art. Aqueous dispersions have been used in a wide variety of fields since an aqueous dispersion prepared by using water as its dispersion medium is far more advantageous than the dispersions prepared by using an organic solvent for the dispersion medium in view of flammability, working environment, handling convenience, and the like. For example, when an aqueous dispersion is coated and dried on a surface of a substrate such as paper, fiber, wood, metal, or plastic molded article, the resin coating formed will provide the substrate with water resistance, oil resistance, chemical resistance, corrosion resistance and heat sealability.

Conventional aqueous dispersions of a thermoplastic resin have been produced either by a process wherein a polymerizable monomer which is the resin raw material is polymerized by emulsion polymerization in an aqueous medium in the presence of an emulsifying agent, or by a process wherein a molten thermoplastic resin and an aqueous medium, and optionally, a surfactant are agitated by applying shearing force. The former process is associated with the disadvantage of the limited number of the polymerizable monomers that can be used, and hence, in the limited number of the aqueous dispersion of the thermoplastic resin that can be produced, is limited. The former process also suffers from complicated control of the polymerization reaction as well as intricate equipment. On the other hand, the latter process is applicable to a wide variety of resins in a relatively simple equipment.

Many improvements are proposed for the latter process. For example, JP-A 51-12835 discloses a method wherein a thermoplastic resin is kneaded with a water-soluble high molecular weight compound, and then, dispersed in water. However, the coating obtained from the aqueous dispersion produced by such method suffered from insufficient mechanical strength and inferior water resistance due to the presence of the water-soluble high molecular weight compound.

JP-B 57-23703 discloses a method wherein polypropylene kneaded with a dispersing agent selected from; a surfactant, a water-soluble polymer, and a water-swellable polymer is dispersed in water. The particles in the aqueous dispersion produced by such method had a relatively large diameter, and use of a petroleum resin was necessary to reduce the particle diameter of such an aqueous dispersion. The coating obtained from such an aqueous dispersion then suffered from tackiness.

JP-A 56-2149 discloses a method wherein an aqueous dispersion is produced by kneading an olefinic resin and an aqueous solution of a partially saponified polyvinyl alcohol. The coating prepared therefrom also suffered from insufficient physical properties due to the presence of the water-soluble resin.

A different type of method is disclosed in JP-B 58-42207. In this method, a polyolefin melt kneaded with a carboxyl group-containing polyolefin is introduced in hot water containing a basic substance, and shearing force is applied to obtain the dispersion. The aqueous dispersion produced by this method is quite preferable since the dispersion is free from the water-soluble polymer and the water-swellable polymer, and the dispersion is prepared without using any petroleum resin. However, when a dispersion having a small particle diameter is desired, this type of aqueous dispersion suffers from the problem of the limited number of resins that can be used for the raw resin material. In addition, production of this type of dispersion required a pressure resistant reactor since the resin is dispersed at a high temperature and under a high pressure. In view of such situation, there is a demand for developing a method capable of producing an aqueous dispersion which is capable of using a wide variety of usage of polymer and which can be produced without using any water-soluble polymer or water-swellable polymer and without using the petroleum resin.

In consideration of such situation, the inventors of the present invention made an intensive study and found that when an olefinic resin and an olefinic polymer containing carboxyl group, its anhydride group or ester group are melt kneaded with a basic substance and an optional anionic surfactant in the presence of a limited amount of water, phase inversion, that is, an inversion of the phase wherein the water is converted to the dispersion medium phase and the solid content is converted to the dispersed particle phase apparently takes place to results in the aqueous dispersion of the solid, and that once such phase inversion has taken place, a large amount of water can be supplemented in or outside the system to enable the production of the aqueous dispersion having a wide range of water content (JP-A 61-123664, JP-B 7-8933).

Such aqueous dispersion, however, contained the olefinic polymer containing carboxyl group, its anhydride group or ester group as an essential component in addition to the olefinic resin, and the dispersion often failed to exhibit physical properties inherent to the olefinic resin. Increase in the olefinic resin content for the purpose of obviating such problem resulted in the decrease of the aqueous dispersion yield, and use of a surfactant resulted in the decrease of the water resistance of the coating.

Recently, thermal transfer recording systems are widely used as an output unit for facsimiles, personal computers, word processors and the like. In the printing using a thermal transfer recording system, a thermal transfer recording medium (an ink ribbon) having a thermal transfer layer comprising a colorant and a binder disposed on a substrate is used. The printing in such a thermal transfer recording system is accomplished by contacting a thermal head with the thermal transfer recording medium on the side of the substrate and heatingdots provided on the thermal head in correspondence with the information to be output to thereby melt or soften the thermal transfer layer of the positions corresponding to the heated dots and releasing the thermal transfer layer at such positions for transfer onto the surface of a paper or other transfer medium.

The binder used in such thermal transfer layer has been typically a wax such as carnauba wax. Such waxes, however, have suffered from insufficient cohesion to the thermal transfer layer itself due to the low molecular weight., and satisfactory results could not be obtained in the printing of season tickets and the like wherein durability is required.

In order to obviate such drawbacks, use of an ethylene-vinyl compound copolymer such as ethylene-vinyl acetate copolymer or ethylene-ethyl acrylate copolymer has been investigated. Use of such copolymeric resins was quite suitable for applications where durability is required owing to their capability of forming a strong thermal transfer layer. On the other hand, use of such copolymeric resin was associated with the problem of reduced workability in the hot melt coating, namely, reduced workability in the production of the thermal transfer recording medium when the resin had a high molecular weight, namely, when the resin had a high melt viscosity.

In view of such situation, there is proposed coating of an ethylene-vinyl compound copolymer onto the substrate after preparing an aqueous dispersion of such copolymer. In this method, workability is not reduced even in the coating of a copolymer having a molecular weight higher than that of the wax. Production of conventional copolymers, however, involved use of a low molecular weight surfactant, and the resulting coating suffered from poor water resistance. When the use of such surfactant is omitted to prevent the decrease in the water resistance, diameter of the dispersed particles of the copolymer constituting the aqueous dispersion is unduly increased and formation of the coating having a smooth outer surface was difficult.

SUMMARY OF THE INVENTION

In view of the situation as described above, an object of the present invention is to provide an aqueous dispersion which has obviated the disadvantages of the prior art; and a method for producing such an aqueous dispersion; and more particularly, to provide an aqueous dispersion of a thermoplastic resin which is capable of forming a coating exhibiting excellent water resistance, oil resistance, chemical resistance and adhesion to non-polar materials; and a method for producing such an aqueous dispersion.

Another object of the present invention is to provide a thermal transfer layer which has obviated the disadvantages of the prior art; and a thermal transfer recording medium coated with such a thermal transfer layer; and more particularly, to provide a thermal transfer layer which contains a binder derived from the aqueous dispersion of a thermoplastic resin as described above, and in particular, a binder derived from the aqueous dispersion of an ethylene-vinyl compound copolymer and which has excellent water resistance as well as capability of forming a coating having a smooth outer surface owing to the small dispersion particles; and a thermal transfer recording medium having a thermal transfer layer on a substrate prepared by coating the aqueous dispersion on the substrate followed by drying.

According to first aspect of the present invention, there are provided an aqueous dispersion comprising (A) a thermoplastic resin, (B) a salt of a fatty acid containing 25 to 60 carbon atoms, and (C) water, wherein solid content is uniformly dispersed in the aqueous phase; and an aqueous dispersion comprising (A) a thermoplastic resin, (B) a salt of a fatty acid containing 25 to 60 carbon atoms, (B') a fatty acid containing 25 to 60 carbon atoms and/or an ester of a fatty acid containing 25 to 60 carbon atoms, and (C) water, wherein solid content is uniformly dispersed in the aqueous phase.

A preferable embodiment according to the first aspect of the invention is an aqueous dispersion wherein content of (B) a salt of a fatty acid containing 25 to 60 carbon atoms is in the range of from 0.5 to 30 parts by weight, and content of (C) water is in the range of 3 to 25% by weight per 100 parts by weight of (A) a thermoplastic resin; and total content of (A) and (B) is in the range of from 75 to 97% by weight; and another preferable embodiment according to the first aspect of the invention is an aqueous dispersion wherein content of (B) a salt of a fatty acid containing 25 to 60 carbon atoms and (B') a fatty acid containing 25 to 60 carbon atoms and/or, an ester of a fatty acid containing 25 to 60 carbon atoms is in the range of from 0.5 to 30 parts by weight, and content of (C) water is in the range of 3 to 25% by weight per 100 parts by weight of (A) a thermoplastic resin; and total content of (A), (B) and (B') is in the range of from 75 to 97% by weight.

A more preferable embodiment according to the first aspect of the invention is an aqueous dispersion wherein concentration of the solid content including (A) thermoplastic resin is in the range of from 10 to 70% by weight, and said solid content has an average particle size of from 0.1 to 5 $\mu$m; and still more preferable embodiments according to the first aspect of the invention are an aqueous dispersion wherein said thermoplastic resin (A) is (A') an ethylene-vinyl compound copolymer, and an aqueous dispersion wherein said fatty acid containing 25 to 60 carbon atoms (B) is montanic acid.

According to a second aspect of the present invention, there is provided a method for producing an aqueous dispersion comprising the steps of melt kneading (A) a thermoplastic resin and (B') a fatty acid containing 25 to 60 carbon atoms and/or an ester of a fatty acid containing 25 to 60 carbon atoms to produce a melt kneaded product; and adding a basic substance and 3 to 25% by weight of water based on total dispersion to the resulting melt kneaded product and melt kneading the mixture to thereby neutralize at least a part of said fatty acid and/or saponify at least a part of said fatty acid ester simultaneously with dispersion of said solid content in the aqueous phase.

According to a third aspect of the present invention, there is provided a thermal transfer recording medium comprising a substrate and a thermal transfer layer formed on the substrate wherein said thermal transfer layer contains a binder and a colorant and said binder comprises (A') an ethylene-vinyl compound copolymer and (B) a salt of a fatty acid containing 25 to 60 carbon atoms; and a thermal transfer recording medium wherein said thermal transfer layer comprises 5 to 99% by weight in total of (A') an ethylene-vinyl compound copolymer and (B) a salt of a fatty acid containing 25 to 60 carbon atoms.

According to a third aspect of the present invention, there is also provided a thermal transfer recording medium comprising a substrate and a thermal transfer layer formed on the substrate wherein said thermal transfer layer contains a binder and a colorant and said binder comprises 5 to 99% by weight in total of (A') an ethylene-vinyl compound copolymer, (B) a salt of a fatty acid containing 25 to 60 carbon atoms, and (B') a fatty acid containing 25 to 60 carbon atoms and/or an ester of a fatty acid containing 25 to 60 carbon atoms.

A preferable embodiment according to the third aspect of the invention is a thermal transfer recording medium comprising a thermal transfer layer containing a binder and a colorant wherein said binder contains (B) a salt of a fatty acid containing 25 to 60 carbon atoms in an amount of from 0.5 to 30 parts by weight per 100 parts by weight of (A') an ethylene-vinyl compound copolymer; and another preferable embodiment according to the third aspect of the invention is a thermal transfer recording medium comprising a thermal transfer layer containing a binder and a colorant wherein said binder contains (B) a salt of a fatty acid containing 25 to 60 carbon atoms and (B') a fatty acid containing 25 to 60 carbon atoms and/or an ester of a fatty acid containing 25 to 60 carbon atoms in a total amount of from 0.5 to 30 parts by weight per 100 parts by weight of (A') an ethylene-vinyl compound copolymer.

A more preferable embodiment according to the third aspect of the invention is a thermal transfer recording medium comprising a substrate and a thermal transfer layer formed on the substrate, wherein said thermal transfer layer contains a binder and a colorant and said binder is derived from an aqueous dispersion containing (A') an ethylene-vinyl compound copolymer and (B) a salt of a fatty acid containing 25 to 60 carbon atoms, and wherein said aqueous dispersion is produced by melt kneading (A') an ethylene-vinyl compound copolymer and (B') a fatty acid containing 25 to 60 carbon atoms and/or an ester of a fatty acid containing 25 to 60 carbon atoms to produce a melt kneaded product; and adding a basic substance and 3 to 25% by weight of water based on total dispersion to the resulting melt kneaded product and melt kneading the mixture to thereby neutralize at least a part of said fatty acid and/or saponify at least a part of said fatty acid ester simultaneously with dispersion of said solid content in the aqueous phase.

A still more preferable embodiment according to the third aspect of the invention is a thermal transfer recording medium wherein the ethylene-vinyl compound monomer copolymer (A') of the thermal transfer layer is an ethylene-vinyl acetate copolymer or an ethylene-(meth)acrylate ester copolymer; and another still more preferable embodiment according to the third aspect of the invention is a thermal transfer recording medium wherein the salt of a fatty acid containing 25 to 60 carbon atoms (B) of the thermal transfer layer is an alkaline metal salt of montanic acid.

PREFERRED EMBODIMENTS OF THE INVENTION

Next, the present invention is described in further detail.

The thermoplastic resin (A) constituting the aqueous dispersion of the present invention is a resin which is unsoluble in water and unswellable by water, which is undispersible in water by itself, and which has a molecular weight capable for forming a coating. The term "resin" used herein includes an elastomer. Examples of the thermoplastic resin (A) which may be used in the present invention include homopolymers and copolymers (including elastomers) of an α-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an α-olefin with a conjugated or non-conjugated diene as typically represented by ethylene-butadiene copolymer and ethylene-ethylidene norbornene copolymer; and polyolefins (including elastomers) such as copolymers of two or more α-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers (A') such as ethylene-vinyl acetate copolymer, ethylene-vinyl alcohol copolymer, ethylene-vinyl chloride copolymer, ethylene-(meth)acrylic acid copolymer, and ethylene-(meth)acrylate copolymer; styrenic copolymers (including elastomers) such as polystyrene, ABS, acrylonitrile-styrene copolymer, α-methylstyrene-styrene copolymer; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like. These resins may be used either alone or in combination of two or more.

Of these resins, the preferred for general use are ethylene-vinyl compound copolymers, and homopolymers and copolymers of an α-olefin, and the most preferred is ethylene-vinyl acetate copolymer.

The thermoplastic resin (A) which may be used for the binder component of the thermal transfer layer according to the third aspect of the present invention is ethylene-vinyl compound copolymer (A'). Exemplary ethylene-vinyl compound copolymers include ethylene-polar monomer copolymer containing ethylene-(meth)acrylate copolymers such as ethylene-ethyl (meth)acrylate copolymer, ethylene-methyl (meth)acrylate copolymer, ethylene-propyl (meth)acrylate copolymer, ethylene-butyl (meth)acrylate copolymer, ethylene-hexyl (meth)acrylate copolymer, ethylene-2-hydroxyethyl (meth)acrylate copolymer, ethylene-2-hydroxypropyl (meth)acrylate copolymer, ethylene-glycidyl (meth)acrylate copolymer; ethylene-ethylenically unsaturated acid copolymers such as ethylene-(meth) acrylic acid copolymer, ethylene-maleic acid copolymer, ethylene-fumaric acid copolymer, and ethylene-crotonic acid copolymer; ethylene-vinyl ester copolymers such as ethylene-vinyl acetate: copolymer, ethylene-vinyl propionate copolymer, ethylene-vinyl buytlate copolymer, and ethylene-vinyl stearate copolymer; ethylene-styrene copolymers; and the like. Among these, the preferred are ethylene-vinyl ester copolymers and ethylene-(meth)acrylate copolymers, and the most preferred is ethylene-vinyl acetate copolymers.

The ethylene-vinyl compound copolymer may have a molecular weight which enables formation of the coating after coating on the substrate and drying. Weight ratio of ethylene to the vinyl compound may be in the range of 97/3 to 50/50.

The thermoplastic resin (A) may have any melt flow rate (MFR, JIS K6730) The MFR, however, is in the range of from 0.1 to 800 g/10 min, preferably from 0.5 to 500 g/10 min, and most preferably from 1 to 300 g/10 min in, view of the ease of melt kneadability and physical properties of the coating formed.

The thermoplastic resin (A) in the aqueous dispersion is preferably in the form of particles, which may preferably have an average particle diameter of from 0.1 to 5 μm, and most preferably from 0.1 to 3 μm. The particle diameter may be measured with Microtrack.

Another component of the aqueous dispersion of the present invention is (B) a salt of a fatty acid containing 25 to 60 carbon atoms. The component (B) is preferably an alkali metal salt or an alkaline earth metal salt of a fatty acid containing 25 to 40 carbon atoms, and more preferably an alkali metal salt of montanic acid. Such an alkali metal salt of montanic acid is also preferable as a component of the thermal transfer layer according to the third aspect of the present invention. Use of the salt of a fatty acid containing less than 25 carbon atoms results in reduced water resistance of the coating, and fatty acids containing more than 60 carbon atoms and salts thereof are not readily available.

The aqueous dispersion of the present invention may further contain a fatty acid containing 25 to 60 carbon atoms and/or an ester of a fatty acid containing 25 to 60 carbon atoms in addition to the salt of a fatty acid containing 25 to 60 carbon atoms. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary such alcohol residues include residues of higher alcohols containing 10 to 20 carbon atoms such as cetyl alcohol, stearyl alcohol, and oleyl alcohol. The most preferred are ester wax of montanic acid and montan wax.

The salt of a fatty acid containing 25 to 60 carbon atoms may be produced by neutralizing a fatty acid containing 25 to 60 carbon atoms or by saponifying an ester of a fatty acid containing 25 to 60 carbon atoms.

The thermoplastic resin (A) may be used with the fatty acid salt (B) or with the fatty acid salt (B) and the fatty acid and/or the fatty acid ester (B') at a ratio such that (B) or total of (B) and (B') is from 0.5 to 30 parts by weight, and most preferably from 2 to 20 parts by weight based on 100 parts by weight of (A).

Such compositional ratio also applies to the case of the thermal transfer layer according to the third aspect of the present invention, and 0.5 to 30 parts by weight of (B) or total of (B) and (B') is capable of maintaining the dispersion of the ethylene-vinyl compound copolymer (A') at a sufficient level in the thermal transfer layer.

When (B) or total of (B) and (B') is below the range of from 0.5 to 30 parts by weight, dispersion of (A') will be insufficient. On the other hand, when (B) or total of (B) and (B') is beyond such range, the resulting dispersion will exhibit various features which are different from those inherent to (A'). With regard to the thermal transfer layer, (B) or total of (B) and (B') of less than 0.5 part by weight will invite unduly increased particle diameter of the solid content of the aqueous dispersion, and hence, insufficiently smooth outer surface of the thermal transfer layer. On the other hand, (B) or total of (B) and (B') in excess of 30 parts by weight will not result in physical properties inherent to (A').

The aqueous dispersion of the present invention contains water in addition to the components as described above. The water content is in the range of from 3 to 25% by weight based on the total system, namely, based on the overall aqueous dispersion. The water content of less than 3% by weight is insufficient for inducing the phase inversion, and the aqueous dispersion can not be obtained. The water content of more than 25% by weight will result in a fluid aqueous dispersion. In other words, it is the water content of from 3 to 25% by weight that enables to produce an apparently solid aqueous dispersion.

In the case of thermal transfer layer, dilution with water may be conducted so that the solid content concentration is in the range of from 5 to 95% by weight, preferably from 10 to 80% by weight, and most preferably from 10 to 70% by weight.

The aqueous dispersion of the present invention may be produced either by melt kneading the thermoplastic resin (A) and the fatty acid and/or an ester of the fatty acid (B'), and adding a basic substance and water to the melt kneaded product and further melt kneading the mixture; or by preliminarily neutralizing or saponifying the fatty acid and/or an ester of the fatty acid (B') with a basic substance, melt kneading the neutralized/saponified product with the thermoplastic resin (A), and further melt kneading the product after adding water. The former procedure is preferable for simplicity of the procedure.

Any melt kneading means known in the art may be used for the production of the aqueous dispersion of the present invention. It is, however, preferable to use a kneader, a banbury mixer, or a multi-screw extruder. The melt kneading may be conducted under the conditions which are typically used for melt kneading the thermoplastic resin (A).

The neutralization or the saponification by melt kneading of the present invention is conducted preferably at a proportion of 60 to 150%, and most preferably at a proportion of 80 to 130% of the fatty acid and/or fatty acid ester. As a consequence, the aqueous dispersion of the present invention obtained after the melt kneading and the phase inversion may contain unreacted fatty acid and/or fatty acid ester (B') which had been added as a raw material for the neutralization or saponification. Such unreacted fatty acid and/or fatty acid ester (B'), however, does not substantially affect the property of the aqueous dispersion. The yield of the solid content which mainly comprises the thermoplastic resin (A) is in the range of from 85 to 100% by weight, and preferably, from 90 to 100% by weight.

The aqueous dispersion of the present invention obtained after the melt kneading and the phase inversion may contain 3 to 25% by weight of water. The aqueous dispersion maybe coated on the substrate either with no water supplementation at such water content, or with water supplementation to the solid content concentration as described above. The aqueous dispersion obtained by the melt kneading and the phase inversion may be further supplemented with an aqueous dispersion of an ethylene-vinyl compound copolymer, an aqueous dispersion of a neutralized fatty acid and/or a saponified fatty acid ester, or an aqueous dispersion of fatty acid and/or fatty acid ester.

Examples of the basic substance which. may be used for the neutralization or the saponification of the melt kneaded product include alkaline metals and alkaline earth metals such as sodium, potassium, calcium, strontium, barium, etc.; inorganic amines such as hydroxylamine, ammonium hydroxide, hydrazine, etc.; organic amines such asmethylamine, ethylamine, ethanolamine, cyclohexylamine, tetramethylammonium hydroxide, etc.; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calciumhydroxide, strontiumhydride, barium hydroxide, sodium hydride, potassium hydride, calcium hydride, etc.; and weak acid salt of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate, etc. Among these, the preferred are hydroxide of an alkaline metal and hydroxide of an alkaline earth metal, and the most preferred are potassium hydroxide and sodium hydroxide.

The basic substance is preferably added as an aqueous solution.

The aqueous dispersion of the present invention contains particles having a small average particle diameter of from 0.1 to 5 μm at a high concentration, and the coating obtained therefrom exhibits excellent moisture resistance, water repellency, thermal adhesion to paper, metal, glass, wood, fiber (natural fiber and synthetic fiber), and nonwoven fabric, thermal transfer properties, abrasion resistance, impact resistance, weatherability, solvent resistance, flexibility, and adaptability to high-frequency fabricating.

Therefore, the aqueous dispersion of the present invention can be used for such application as a binder of a coating composition for a coated wall paper; a fiber coating agent (for improving the strength, moisture adsorption, or water repellency of the fiber); a net for construction, a sizing agent for nylon, polyester or glass fibers; a sizing agent/thermal adhesive of a paper or a nonwoven fabric; and an agent for imparting heat sealability with a paper or a film; a thermal adhesive of a sterilized paper; a binder of an ink or a coating composition; a surface coating agent for a paper or a film adapted for use with an ink jet printer; an agent for improving chipping resistance of an automotive coating composition; and the like.

The aqueous dispersion of the present invention may optionally contain additional components in an amount that does not adversely affect the object of the present invention. Exemplary such additional components include water-soluble amino resins such as water-soluble melamine resin and water-soluble benzoguanamine resin and water-soluble epoxy resins for improving coating performance; organic thickeners such as polyvinyl alcohol, polyvinyl pyrrolidone, polyvinyl methylether, polyethylene oxide, polyacrylamide, polyacrylic acid, carboxy methyl cellulose, methyl cellulose, and hydroxyethyl cellulose and inorganic thickeners such as silicon dioxide, active clay, and bentonite for improving the stability and adjusting the viscosity of the dispersion; surfactants such as nonionic surfactants and anionic surfactants and water-soluble polyvalent metal salts for improving the stability of the dispersion; other additives such as anti-rust agent, anti-mold agent, UVabsorber, thermal stabilizer, foaming agent, antifoaming agent, and the like; pigments such as titanium white, red iron oxide, phthalocyanine, carbon black, permanent yellow; and fillers such as calcium carbonate, magnesium carbonate, barium carbonate, talk, aluminum hydroxide, calcium sulfate, kaolin, mica, asbestos, mica, and calcium silicate.

As exemplary applications of the aqueous dispersion of the present invention wherein various features of the aqueous dispersion are fully utilized, thermal transfer medium is described below.

The thermal transfer layer of the present invention contains a colorant in combination with a binder. The binder is the remain which aqueous medium has been totally or partly removed from the aqueous dispersion as described above. The colorants are those generally used in the art.

The thermal transfer recording medium of the present invention comprises a substrate and a thermal transfer layer on the substrate. A backcoat layer may be formed on the side of the substrate where no thermal transfer layer is formed, and a release layer and other layers may be formed on the side of the thermal transfer layer.

The binder constituting the thermal transfer layer may preferably contain an ethylene-vinyl compound copolymer (A') which may be the one as described above and which is most preferably an ethylene-vinyl acetate copolymer, and a fatty acid salt (B) which may typically be an alkaline metal salt of montanic acid.

The transfer layer of the thermal transfer recording medium of the present invention is generally formed by coating an aqueous dispersion containing a colorant and a binder comprising (A') an ethylene-polar monomer copolymer and (B) a salt of a fatty acid containing 25 to 60 carbon atoms on a substrate comprising a resin film, and drying the coated dispersion.

The aqueous dispersion may be coated by various procedure, and for example, by spray coating, curtain flow coating, coating with a roll coater or a gravure coater, brush coating, dipping.

The coating is preferably dried by heating the coated substrate to 50 to 150° C. for 1 to 300 seconds although the drying may be accomplished by natural drying As mentioned above, a colorant is incorporated in the thermal transfer layer in addition to the binder. The colorants used in the present invention may be dies and pigments known in the art which may be used alone or in combination of two or more. Exemplary such colorants include carbon black, nigrosin dye, lamp black, Sudan Black SM, Alkaline Blue, Fast yellow G, Benzidine Yellow, Pigment Yellow, Indo Fast Orange, Irgadine Red, ParanitroanilineRed, Toluidine Red, Carmine F8, Permanent Bordeau FRR, Pigment Orange R, Lithol Red 20, Lake Red C, Rhodamine FB, Rhodamine B Lake, Methyl Violet B Lake, Phthalocianine Blue, Pigment Blue, Briliant Green B, Phthalocyanine Green, Oil Yellow GG, Zapon Fast yellow CGC, Kayaset Y963, Kayaset YG, Sumiblast Yellow GG, Zapon Fast Orange RR, Oil Scarlet, Sumibiast Orange G, Orazole Brown B, Zapon Fast Scarlet CG, Izenspiron Red BEH, Oil Pink OP, Victoria Blue F4R, Fastgen Blue 5007, Sudan Blue, and Oil Peacock Blue. The colorant is incorporated in an amount of from 1 to 95% by weight, and preferably from 2 to 80% by weight of the thermal transfer layer.

The substrate may comprise a film of a thermoplastic resin such as polyethylene terephthalate, polyethylene, polycarbonate, polyimide, polyamide, polyphenylene sulfide, polysulfone, aromatic polyester, polyether ether ketone, polyether sulfone, and polyether imide. The preferred is the film comprising polyethylene terephthalate, polyethylene, polyamide, and polycarbonate, and the most preferred is the film comprising polyethylene terephthalate.

The film may have a thickness preferably in the range of from 0.5 to 50 $\mu$m, and most preferably from 1 to 30 $\mu$m.

In addition to (A') an ethylene-vinyl compound copolymer, (B) a salt of a fatty acid containing 25 to 60 carbon atoms, and (B') a fatty acid containing 25 to 60 carbon atoms and/or an ester of a fatty acid containing 25 to 60 carbon atoms, the binder of the thermal transfer layer of the present invention may contain various resins such as polyolefin, polyolefin copolymer, vinyl chloride copolymer, vinylidene chloride copolymer, polystyrene, styrene copolymer, coumarone-indene copolymer terpene resin, acrylic resin, polyacrylonitrile, acrylonitrile copolymer, diacetoneacrylamide polymer, vinyl acetate copolymer, polyvinylether, polyamide, polyester, polyvinyl acetal resin, polyurethane resin, cellulose derivative, polycarbonate, ionomer, condensate of a cyclic ketone and formaldehyde, condensate of o-xylene or mesitylene and formalin, such condensate modified with rosin, petroleum resin, wax, and other resins, which may be used either alone or in combination of two or more as desired.

The thermal transfer layer of the present invention may have incorporated therein a wax which mainly functions as a release agent. Exemplary waxes include waxes of animal origin such as beeswax and shellac wax, waxes of vegetable origin such as carnauba wax, mineral waxes such as mdntan wax, petroleum waxes such as paraffin wax and microcrystalline wax, and synthetic waxes such as polyvalent alcohol ester of a higher fatty acid, higher amide, higher amine, a condensate of a fatty acid with an aliphatic or aromatic amine, synthetic paraffin, and polyolefin wax.

Such binder component may be incorporated in the layer so that such binder component together with the ethylene-vinyl compound copolymer (A') and the salt of a fatty acid containing 25 to 60 carbon atoms (B) may constitute 5 to 99% by weight, and preferably 20 to 98% by weight of the layer.

Such binder component may be incorporated with the aqueous dispersion of the ethylene-vinyl compound copolymer (A') and the salt of a fatty acid containing 25 to 60 carbon atoms (B).

EXAMPLES

Next, the present invention is further described by referring to the Examples which by no means limit the scope of the present invention.

Preparation Example 1

100 parts by weight of ethylene-vinyl acetate copolymer (Evaflex 420 manufactured by Mitsui DuPont Polychemical Co.; MFR, 150; vinyl acetate content, 19% by weight) and 5 parts by weight of montanic acid (Hechist S manufactured by Clariant Co.; number of carbon atoms, 28 to 32; acid value, 150 mg KOH/g) were mixed, and the mixture was fed to a vented twin screw extruder (PCM-30 manufactured by Ikegai Tekko Co.; L/D=20) at a rate of 3 kg/hr from its hopper.

In the meanwhile, 13% (by weight) aqueous solution of potassium hydroxide was continuously fed from an opening provided in the vent at a rate of 300 g/hr (at a rate of 10% by weight per total mixture), and the mixture was heated and melt kneaded at 160° C. and the molten mixture was continuously extruded. The molten mixture was then cooled to 90° C. by means of a jacketed static mixer at the outlet of the extruder, and introduced into water at 80° C. An aqueous dispersion having a solid content concentration of 44% by weight at pH12 was obtained at an yield of 99.3%. The solid: content in the resulting aqueous dispersion had an average particle diameter measured with Microtrack of 0.6 μm.

Preparation Example 2

The melt kneading, phase inversion, and extrusion were conducted by repeating the procedure of Preparation Example 1 except for the use of ethylene-vinyl acetate copolymer (MFR, 150; vinyl acetate content, 28% by weight) to obtain an aqueous dispersion at an yield of 99.3%. The aqueous dispersion had a solid content concentration of 45% by weight, a pH of 12, and an average particle diameter of 0.5 μm.

Preparation Example 3

The melt kneading, phase inversion, and extrusion were conducted by repeating the procedure of Preparation Example 1 except for the use of propylene-butene copolymer (MFR, 3.2; butene content, 30% by weight) to obtain an aqueous dispersion at an yield of 98.5%. The aqueous dispersion hada solid content concentration of 45% by weight, a pH of 12, and an average particle diameter of 0.7 μm.

Preparation Example 4

The melt kneading, phase inversion, and extrusion were conducted by repeating the procedure of Preparation Example 1 except for the use of propylene-butene-ethylene copolymer (MFR, 6.1; molar ratio, 11/66/23) to obtain an aqueous dispersion at an yield of 95.5%. The aqueous dispersion had a solid content concentration of 45% by weight, a pH of 12, and an average particle diameter of 0.8 μm.

Preparation Example 5

The procedure of Preparation Example 1 was repeated except that ethylene-vinyl acetate copolymer used in Preparation Example 1 was replaced with ethylene-ethyl acrylate copolymer (Evaflex A709 manufactured by Mitsui DuPont Polychemical Co.; MER, 25; ethyl acrylate content, 35% by weight) to obtain an aqueous dispersion at an yield of 99% by weight. The aqueous dispersion had a solid content concentration of 44% by weight and a pH of 12. The average particle diameter of the solid content of the aqueous dispersion was measured with Microtrack to be 0.6 μm.

Preparation Example 6

The procedure of Preparation Example 1 was repeated except that montanic acid used in Preparation Example 1 was replaced with oleic acid (number of carbon atoms, 17) to obtain an aqueous dispersion at an yield of 99% by weight. The aqueous dispersion had a solid content concentration of 44% by weight and a pH of 12. The average particle diameter of the solid content of the aqueous dispersion was measured with Microtrack to be 0.8 μm.

Preparation Comparative Example 1

The melt kneading, phase inversion, and extrusion were conducted by repeating the procedure of Preparation Example 1 except that montanic acid was replaced with ethylene-acrylic acid copolymer (AC-5120 manufactured by Allied Signal Co.; viscosity average molecular weight, 3500; acid value, 120 mg KOH/g) to obtain an aqueous dispersion at an yield of 80%. The aqueous dispersion had a solid content concentration of 44% by weight, a pH of 12, and an average particle diameter of 1.5 μm.

Preparation Comparative Example 2

The melt kneading, phase inversion, and extrusion was conducted by repeating the procedure of Preparation Example 1 except that 40 parts by weight of acid modified polyethylene wax (HiWax 2203A manufactured by Mitsui Chemicals Inc.; viscosity average molecular weight, 2700; acid value, 30 mg KOH/g) was used instead of the montanic acid to obtain an aqueous dispersion at an yield of 50%. The aqueous dispersion had a solid content concentration of 44% by weight, a pH of 12, and an average particle diameter of 3.5 μm.

Application Example 1

The aqueous dispersion produced in Preparation Example 1 and an aqueous dispersion of carbon black (at a solid content concentration of 50% by weight) were mixed at a solid content ratio of 70/30, and the mixture was agitated to produce an aqueous dispersion (solid content concentration, 46% by weight) The thus produced aqueous dispersion was coated on a polyethylene terephthalate (PET) film with a bar coater to a dry thickness of 2 μm, and the resulting product was dried in an air oven at 100° C. for 3 minutes to obtain the sample. The sample was immersed in water at 40° C. for 12 hours to examine the coated surface. No change was recognized on the exterior surface of the coating of the sample before and after the immersion to indicate the sufficient water resistance of the coating. The transfer layer also had excellent smoothness on its exterior surface as well as sufficient transfer properties. The sample is well adapted for use as a recording medium of a personal computer.

Application Example 2

A sample was prepared by repeating the procedure of Application Example 1 except that the aqueous dispersion produced in Preparation Example 1 was replaced with the aqueous dispersion produced in Preparation Example 5. The sample was tested for its water resistance by repeating the procedure of Application Example 1. No change was recognized on the exterior surface of the coating of the sample before and after the immersion.

Application Comparative Example 1

A sample was prepared by repeating the procedure of Application Example 1 except for the use of a commercially available ethylene-vinyl acetate copolymer emulsion (solid content concentration, 40% by weight; average particle diameter, 0.5 µm; supplemented with a nonionic surfactant). The sample was tested for its water resistance by repeating the procedure of Application Example 1. The coating was peeled off the sample.

Application Comparative Example 2

A sample was prepared by repeating the procedure of Application Example 1 except that the aqueous dispersion produced in Preparation Example 1 was replaced with the aqueous dispersion produced in Preparation Example 6. The sample was tested for its water resistance by repeating the procedure of Application Example 1. The coating exhibited blisters where the coating became peeled off the substrate.

MERITS OF THE INVENTION,

The aqueous dispersion of the presept invention is capable of forming a coating which exhibits excellent water resistance, oil resistance, chemical resistance and adhesion to non-polar materials, and therefore, when the aqueous dispersion of the present invention is coated and dried on the surface of a substrate such as paper, fiber, wood, metal, or plastic molded article, the resulting resin coating will provide the substrate with water resistance, oil resistance, chemical resistance, corrosion resistance and heat sealability.

In addition, the aqueous dispersion of the present invention can be readily produced by simple melt kneading.

The thermal transfer medium of the present invention contains (A') an ethylene-polar monomer copolymer having a melt formable molecular weight in combination with (B) a salt of a fatty acid containing 25 to 60 carbon atoms, and does not contain any surfactant. Therefore, the thermal transfer layer on the substrate exhibits excellent water resistance and outer surface smoothness as well as good compatibility with the colorants, and the resulting thermal transfer recording medium is quite suitable for use as a recording medium for a facsimile, personal computer, word processor and the like.

What is claimed is:

1. An aqueous dispersion comprising (A) a thermoplastic ethylene-vinyl compound copolymer, or a homopolymer or copolymer of an α-olefin; (B) an alkali metal salt of montanic acid, and (C) water, wherein solid content is uniformly dispersed in the aqueous phase.

2. The aqueous dispersion according to claim 1, wherein (A) and (B) combined comprise from 75 to 97% by weight of the dispersion; and wherein the amount of (B) is from 0.5 to 30 parts by weight based on 100 parts by weight of (A), and the amount of,(C) is from 3 to 25% by weight per 100 parts by weight of (A).

3. The aqueous dispersion according to claim 2, wherein the amount of (B) is from 2 to 20 parts by weight, based on 100 parts by weight of (A).

4. An aqueous dispersion comprising (A) a thermoplastic ethylene-viny compound copolymer, or a homopolymer or copolymer of an α-olefin; (B) an alkali metal salt of montanic acid, (B') montanic acid or ester thereof or mixture of montanic acid and ester thereof; and (C) water, wherein solid content is uniformly dispersed in the aqueous phase.

5. The aqueous dispersion according to claim 4, wherein (A), (B) and (B') combined comprise from 75 to 97% by weight of the dispersion; and wherein the combined amount of (B) and (B') is from 0.5 to 30 parts by weight of the dispersion, and the amount of (C) is from 3 to 25% by weight per 100 parts by weight of (A).

6. The aqueous dispersion according to claim 5, wherein the amount of (B) plus (B') is from 2 to 20 parts by weight, based on 100 parts by weight of (A).

7. The aqueous dispersion according to any one of claims 1, 2, 4 or 5 wherein the solid content of said dispersion is from 10 to 70% by weight and wherein the average particle size of said solids is from 0.1 to 5 µm.

8. The aqueous dispersion according to claim 7, wherein the thermoplastic ethylene-vinyl compound copolymer comprises an ethylene-vinyl acetate copolymer.

9. The aqueous dispersion according to any one of claims 1, 2, 4 or 5, wherein the thermoplastic ethylene-vinyl compound copolymer comprises an ethylene-vinyl acetate copolymer.

10. A method for producing an aqueous dispersion comprises:

(1) melt kneading (A) a thermoplastic resin and (B') (i) a fatty acid containing 25 to 60 carbon atoms or (ii) an ester of said fatty acid, or (iii) a mixture of a fatty acid containing 25 to 60 carbon atoms and an ester of a fatty acid containing 25 to 60 carbon atoms, to produce a melt-kneaded product, (2) adding (a) a basic substance and (b) from 3 to 25% by weight, based on the total weight of the aqueous dispersion, of water, to said melt-kneaded product, and melt kneading the resulting mixture to thereby neutralize at least a part of said fatty acid and/or to saponify at least a part of said fatty acid ester and disperse the solid content in the aqueous phase, whereby the resulting aqueous dispersion comprises (A) said thermoplastic resin, (B) a salt of said fatty acid (i) or a salt of said fatty acid ester (ii), or salt of said mixture (iii), and (C) water, wherein solid content is uniformly dispersed in the aqueous phase.

11. The method according to claim 10, wherein the thermoplastic resin (A) comprises ethylene-vinyl compound copolymer or homopolymer or copolymer of α-olefin.

12. The method according to claim 10, wherein the thermoplastic resin (A) comprises ethylene-vinyl acetate copolymer.

13. The method according to claim 10 or claim 11 or claim 12, wherein the fatty acid (i) comprises montanic acid; and the fatty acid ester (ii) comprises an ester of montanic acid.

14. The method according to claim 10, wherein the amount of basic substance in step (2) is sufficient to partially neutralize said fatty acid (i) or partially neutralize said fatty acid ester (ii) or partially neutralize and partially saponify the acid and ester, respectively, in said mixture.

* * * * *